3,730,836
PROCESS FOR PRODUCING ADENOSINE
BY FERMENTATION
Kenichi Komatsu and Akira Saijo, Miyazaki, Katsuji Haneda, Saitama, and Ryoji Kodaira and Hiroshi Ohsawa, Miyazaki, Japan, assignors to Asahi Kasei Kogyo Kabushiki Kaisha, Osaka, Japan
No Drawing. Filed Nov. 20, 1970, Ser. No. 91,524
Claims priority, application Japan, Dec. 24, 1969, 44/103,388
Int. Cl. C12d 13/06
U.S. Cl. 195—28 N                 5 Claims

ABSTRACT OF THE DISCLOSURE

A process for producing purine nucleoside, i.e. adenosine, which is a useful substance as precursors of nucleotides having flavoring properties or as precursors of energy supplying sources in living bodies, by fermentation. In the process new strain identified at ATCC No. 21616, which is derived from a parent strain named as Bacillus No. ASB–5741 (ATCC No. 21615) belonging to a new species of the genus Bacillus are cultivated in a culture medium under aerobic conditions to accumulate the purine nucleoside in the culture medium.

---

This invention relates to a process for producing purine nucleosides by fermentation. More particularly, this invention relates to a process which comprises cultivating in a nutrient medium under aerobic conditions a purine nucleoside-producing microorganism derived from a new strain named as a Bacillus, ASB–5741 (ATCC No. 21615) belonging to a new species in genus Bacillus and accumulating said purine nucleoside in the medium.

Adenosine is a constituent component of ribonucleic acid found in all living bodies. Xanthosine may easily be produced from guanosine through a deamination reaction. Adenosine is a precursor of adenosine tri-phosphate which is an energy supplying source in a living body. Some derivatives from the purine nucleotide is useful as bactericides, anticarcinogens or substances regulating metabolism in living bodies. Hence, the use of purine nucleosides as medicaments or chemicals has recently become of public interest.

Purine ribonucleosides have hitherto been obtained from the ribonucleic acid isolated from animal bodies or from the ribonucleic acid of the cells of microorganisms such as yeast cells. The production cost was therefore very high. There have been made many studies to devise a more economical process for producing these substances by direct fermentation. Japanese patent publication Nos. 1,699/62 and 16,346/64 disclose a method of obtaining adenosine and guanosine using mutants of Bacillus subtilis. Japanese patent publication No. 23,100/63 discloses a method of obtaining xanthosine using Aerobacter aerogenes.

In accordance with the present invention, a purine nucleoside is produced by the use of a new strain belonging to genus Bacillus. The new strain is obtained by applying various mutation treatments to a new species of genus Bacillus newly isolated from the soil in the suburbs of Beppu City, Oita Prefecture, Japan. The strain is an adenosine-producing strain. It is cultivated in a growth medium under aerobic conditions.

The bacteriological properties of the parent strain ASB–5741 (ATCC 21615), were examined according to "Manual of Microbiological Method" (edited by American Bacteriological Society) and "Saikin-Gaku Jisshū Teiyō" ("A Guide of Microbiological Experiment") (edited by the Society of Schoolmates in the Institute of Research in Infections Diseases, Tokyo University).

(A) Microscopic observation (cultivated on nutrient agar slant for 24–48 hrs. at 37° C.)
  (1) Rod-shaped cell, 0.7–0.9 by 2.5–3.5 microns, not in chains
  (2) Non-motile
  (3) Spore forming, but very weak, 0.8 by 1.3 microns, ellipsoidal, central, sporangia not definitely swollen
  (4) Gram-positive in 24 hrs. culture, but Gram-negative in further prolonged culture
(B) Cultural characteristics (cultivated at 37° C.)
  (1) Nutrient agar slant
    (1) Growth: moderate
    (2) Form of growth: filiform
    (3) Luster.: dull
    (4) Colour: grayish white
    (5) Adherence: slight
    (6) Smell: nothing
  (2) Nutrient agar colonies
    (1) Form: circular
    (2) Surface: rough, sometimes smooth
    (3) Edge: irregular
    (4) Elevation of growth: slightly convex
    (5) Optical characters: opaque, dull
    (6) Colour: grayish white
  (3) Nutrient agar stab
    (1) Growth on the surface: abundant
    (2) Form of growth: filiform
  (4) Nutrient broth
    (1) Surface growth: ring
    (2) Not turbid
    (3) Sediment: flaky
  (5) Potato agar slant
    (1) Growth: abundant
    (2) Colour: grayish white
    (3) Colour of medium: unchanged
  (6) Glucose agar slant: growth abundant, protoplasm of young cells not vacuolated when lightly stained
  (7) Gelatin stab: liquefied in crateriform
  (8) NaCl-nutrient broth: growth up to a concentration of 7.0% NaCl
(C) Physiological characteristics
  (1) Temperature optimal for growth: 30° C. to 37° C., no growth at 65° C.
  (2) Aerobic
  (3) pH: optimum between 7.0 and 8.0. Good growth between 6.0 and 9.0
  (4) Nitrites not produced from nitrates
  (5) Citrates utilized
  (6) pH of glucose broth: 5.0 after cultured for 7 days
  (7) Growth in the medium containing glucose under anaerobic conditions: scant (slightly positive)
  (8) No gas produced from glucose under anaerobic conditions
  (9) No gas produced from nitrate under alkaline, anaerobic conditions
  (10) Voges-Proskauer reaction: negative
  (11) Indole not produced
  (12) Lithomas milk medium: solidified and liquefied after incubation for 3 days, perfectly liquefied, alkaline after incubation for 7 days
  (13) Ammonium salts utilized as a source of nitrogen
  (14) Starch hydrolyzed
  (15) Cellulose not hydrolyzed
  (16) Catalase: positive
  (17) Urease: negative
  (18) Acid production from sugar
    (1) Arabinose +

(2) Xylose +
(3) Glucose +
(4) Mannose —
(5) Fructose +
(6) Galactose —
(7) Lactose —
(8) Maltose +
(9) Sucrose +
(10) Trehalose —
(11) Raffinose —
(12) Sorbit —
(13) Inositol —
(14) Mannitol —
(15) Glycerol —
(16) Salicin —
(17) α-Methyl glucoside —
(18) Inulin —
(19) Dextrin —
(20) Starch +
(21) Cellulose —

These characteristics were compared with those disclosed in "Bergey's Manual of Determinative Bacteriology" (7th edition), and it was concluded that the parent strain is a new species. The strain is placed in the genus Bacillus by the fact that it is a rod-shaped cell and Gram-positive, that it forms spore, that it has the ability to hydrolyze protein, that it contains catalase, and that it is aerobic.

The parent strain does not belong to Group II or Group III of genus Bacillus, because its sporangium is not swollen.

The present strain does not belong to Group I-A to which *Bacillus megaterium* belongs by reason of the fact that cell diameter is not more than 0.9 micron and that the protoplasm of young cells is not vacuolated when lightly stained.

As for Group I-B, the parent strain does not belong to Group 2 to which *Bacillus firmus* or *Bacillus lentus* belongs, in view of the fact that abundant growth is observed on glucose nutrient agar slant and that it has ability to utilize ammonium salts and citric acid. It resembles *Bacillus subtilis* or *Bacillus pumilus*, because growth is observed even at a concentration of 7.0% NaCl. However, it does not correspond to *Bacillus subtilis*, *Bacillus licheniformis* or *Bacillus pumilus* in the following characteristics:

|  | Parent strain | Bacillus subtilis | Bacillus pumilus | Bacillus licheniformis |
|---|---|---|---|---|
| Starch hydrolysis | + | + | — | + |
| Reduction of nitrate | — | + | — | + |
| VP reaction | — | + | + | + |

As apparently seen from the characteristics mentioned above, there is no species which is strictly identical with the parent strain, in the genus Bacillus. It has been concluded therefore that this strain is a new species. It has been deposited at the American Type Culture Collection and assigned the accession No. 21615.

Various kinds of purine nucleoside-producing mutants are obtained from the parent strain by applying the following treatment with the mutagen N-methyl-N'-nitro-N-nitrosoguanidine. For this purpose an inosine-producing mutant which requires adenine, threonine and histidine for growth was first isolated by applying the mutation treatment to the strain ASB–5741 (ATCC No. 21615) several times. By further applying the mutation treatment to the inosine-producing mutant, a xanthosine-producing mutant was obtained out of about $10^6$ cells. Then, a guanosine-producing strain and a mutant producing both guanosine and xanthosine were derived from the xanthosine-producing mutant by further application of mutation treatments. The guanosine-producing strain requires adenine, threonine and histidine for its growth, as does the inosine-producing mutant.

A mutant having no adenine requirement for growth was derived from the guanosine-producing strain, and then the purine base requiring property was again imparted thereto. An adenosine-producing strain was found among the xanthine-requiring mutants and a xanthosine-producing strain among the guanine-requiring mutants. All of these strains were found to be lacking in spore-forming ability.

A representative strain is ASB–5741–2059 A (ATCC No. 21616) as an adenosine-producing strain. It is a nutrient requiring strain.

The foregoing strain is cultivated in a nutrient medium under aerobic conditions. The medium contains sugar as its main ingredient, and also sources of nitrogen, inorganic salts and the growth factor corresponding to the requirement of the strain used.

Sugars may include, for example, waste molasses, starch hydrolysate, glucose, sucrose, fructose and the like. It is preferred to add these sugars to the medium in high concentrations in order to obtain the best possible yield of purine nucleosides. On the other hand, if they are used in concentrations exceeding the physiological limit of the strain used, the growth of strain is hindered so that fermentation is delayed. Thus, the most preferable concentration of sugar is in the range of 5 to 12% wt./vol. In the event that sugar is added in a concentration exceeding this range, it should be added intermittently, while the concentration of sugar remaining in the culture medium is suitably controlled during the course of fermentation.

Ammonia and various inorganic ammonium salts may be used as a source of nitrogen. The nitrogen source, for example, ammonium chloride, may be added in an amount ranging from about 1.5 to 2.5% (wt./vol.).

Inorganic salts which may be added to the medium are selected so that phosphate, potassium, magnesium, iron, manganese and the like ions are present in appropriate amounts in the medium.

Additionally, growth factor, that is, organic nutrient should suitably be added to the medium. Adenosine-producing strain requires guanine and amino acids (histidine an threonine). As guanine supplying sources, yeast cell, hydrolysates thereof, yeast extracts or ribonucleic acid, or the like may be used. Similarly, as guanine sources, isolated guanine or derivatives thereof may also be employed. As amino acid supplying sources, the organic nutrient sources mentioned above (except ribonucleic acid), defatted soybean or various kinds of protein autolysate solutions may be used. The amount of organic nutrient supplying source to be utilized is determined appropriately based on the amount of purine bases and amino acids contained therein. The above-mentioned guanine is used in an amount of 50–200γ/ml. and each amino acid in an amount of 50–300γ/ml.

The cultivation should be conducted under aerobic conditions for most effective utilization of sugar. The most preferred aeration condition for each strain is obtained when 20–40 ml. of culture medium is poured into a Sakaguchi flask of 500 ml. capacity and the flask is shaken at the rate of 130 times/minute.

Controlling of pH in the course of cultivation is also very important. pH of culture medium should be maintained in the range of pH 5.0–7.0. To that effect, calcium carbonate, ammonia, sodium hydroxide or the like are used. Ammonia is most preferred because of its function as a nitrogen source.

Cultivation of the strain is effected at temperatures ranging from 30° to 37° C.

Fermentation is completed after cultivation is continued for 60–90 hours. As the result, a large amount of adenosine is accumulated in corresponding culture medium.

Isolation of purine nucleosides is carried out by applying any of conventional methods or combinations thereof to the supernatant which is obtained by eliminating cell bodies from fermentation broth by filtration or centrifugalization. For example, active charcoal adsorption methods, ion-exchange resin methods, condensation- or cooling-crystallization methods or the like are preferably used.

The present invention will be further described and illustrated by the following non-limiting examples. Unless otherwise noted, "%" signifies "% wt./vol."

EXAMPLE 1

An adenosine-producing strain, Bacillus ASB-5741-2059A (ATCC No. 21616), was cultured under aerobic conditions at 32° C. for 15 hrs. in a bouillon medium containing 0.5% of yeas t extract. Two ml. of the broth thus obtained was inoculated to 30 ml. of a fermentation medium (pH 7.5) containing 10% of glucose, 0.2% of potassium dihydrogen phosphate, 2.0% of ammonium chloride, 0.05% of magnesium sulfate, 0.001% of manganese chloride, 0.001% of ferrous sulfate, 250γ/ml. of guanosine and 0.8% of defatted soybean. The medium had been prepared in a 500 ml. vol. Sakaguchi flask and sterilized at 120° C. for 15 minutes. Calcium carbonate which had been separately sterilized, was added to the medium at a concentration of 5.0%. Cultivation was effected at 32° C. for 80 hrs. with shaking to accumulate 10.5 g./l. of adenosine in the medium. Cells were removed from the broth by means of centrifuge. The supernatant (1 l.) obtained therefrom was adjusted at pH of 4.0, and then passed through a column of active charcoal for adsorption of adenosine. The column was washed with water and subjected to elution with a solution of methanol-isooctanol-ammonia-water (50:1:2:47). The eluate was concentrated and passed through a column of anion exchange resin [Dowex I (Cl-type)] to obtain a fraction containing adenosine. The fraction was concentrated, and ethanol was added to obtain 7.9 g. of crystalline adenosine.

EXAMPLE 2

Example 1 was repeated except that of beet molasses corresponding to 10% glucose was used in place of glucose. As the result, 9.2 g./l. of adenosine was accumulated in the medium.

We claim:

1. A process for producing adenosine by fermentation which comprises cultivating under aerobic conditions a Bacillus ATCC 21616 in a culture medium containing sugar, a nitrogen source, inorganic salts and a guanine source, and accumulating said adenosine in the culture medium.

2. The process according to claim 1 wherein waste molasses, starch hydrolysate, glucose, sucrose or fructose is used as sugar in the concentration of from about 5–12% wt./vol.

3. The process according to claim 1 wherein cultivation is effected in the medium containing guanine and amino acid.

4. The process according to claim 1 wherein cultivation is effected in the medium at a pH of from 5 to 7.

5. A process as in claim 1 which further comprises recovering adenosine by removing the cells from the culture medium and subjecting the supernatant obtained thereby to an isolating treatment utilizing an active charcoal adsorption method, an ion-exchange resin method, a concentration-crystallization method, a cooling-crystallization method or combinations thereof.

References Cited

UNITED STATES PATENTS

| | | | |
|---|---|---|---|
| 3,298,923 | 1/1967 | Banno et al. | 195—28 N |
| 3,135,666 | 6/1964 | Hara et al. | 195—28 N |
| 3,222,257 | 12/1965 | Shiro et al. | 195—28 N |
| 3,258,408 | 6/1966 | Okumura et al. | 195—28 N |

ALVIN E. TANENHOLTZ, Primary Examiner